US007560161B2

(12) United States Patent
Qi et al.

(10) Patent No.: US 7,560,161 B2
(45) **Date of Patent: *Jul. 14, 2009**

(54) INORGANIC MATERIAL SURFACE GRAFTED WITH CHARGE TRANSPORT MOIETY

(75) Inventors: Yu Qi, Oakville (CA); Nan-Xing Hu, Oakville (CA); Ah-Mee Hor, Mississauga (CA); Cheng-Kuo Hsiao, Mississauga (CA); Rafik O. Loutfy, Willowdale (CA)

(73) Assignee: Xerox Corporation, Norwalk, CT (US)

( * ) Notice: Subject to any disclaimer, the term of this patent is extended or adjusted under 35 U.S.C. 154(b) by 566 days.

This patent is subject to a terminal disclaimer.

(21) Appl. No.: 10/914,897

(22) Filed: Aug. 9, 2004

(65) Prior Publication Data

US 2006/0029803 A1 Feb. 9, 2006

(51) Int. Cl.
*B32B 15/02* (2006.01)

(52) U.S. Cl. .................................... 428/403; 428/404

(58) Field of Classification Search ...................... None
See application file for complete search history.

(56) References Cited

U.S. PATENT DOCUMENTS

| | | | | |
|---|---|---|---|---|
| 6,074,791 | A | 6/2000 | Jennings et al. | 430/58.8 |
| 6,861,091 | B2 * | 3/2005 | Sellinger | 427/157 |
| 6,887,517 | B1 * | 5/2005 | Cook et al. | 427/214 |
| 6,946,226 | B2 * | 9/2005 | Wu et al. | 430/64 |
| 7,153,574 | B2 * | 12/2006 | Qi et al. | 428/403 |
| 2006/0029872 | A1 * | 2/2006 | Qi et al. | 430/58.8 |

* cited by examiner

*Primary Examiner*—Monique R Jackson
(74) *Attorney, Agent, or Firm*—Pillsbury Winthrop Shaw Pittman LLP

(57) ABSTRACT

A surface-grafted material having an inorganic material, a linking group, and a charge transport moiety capable of transporting holes or electrons, and the charge transport moiety is grafted to a surface of the inorganic material via the linking group.

11 Claims, 2 Drawing Sheets

INORGANIC MATERIAL SURFACE GRAFTED WITH CHARGE TRANSPORT MOIETY

CROSS-REFERENCE TO RELATED APPLICATIONS

Attention is directed to U.S. patent application Ser. No. 10/914,868 filed Aug. 9, 2004, (Publication No. U.S. 2006/0029872 A1) now U.S. Pat. No. 7,232,633 entitled, "Imaging Member Having Inorganic Material Filler Surface Grafted with Charge Transport Moiety." The disclosure of this reference is hereby incorporated by reference in its entirety.

BACKGROUND

Disclosed herein are inorganic materials surface grafted with charge transport moieties, imaging members having surface grafted inorganic materials as fillers in at least one layer, and methods for grafting charge transport moieties onto inorganic materials. The grafted inorganic materials may have many uses such as fillers in layers of imaging members. Imaging members include photosensitive members or photoconductors useful in electrostatographic apparatuses, including printers, copiers, other reproductive devices, including digital and image-on-image apparatuses. In embodiments, the inorganic materials can be metal oxides. In other embodiments, the inorganic materials can be nano-sized fillers. The grafted inorganic materials provide an imaging member having increased wear resistance (including increased abrasion and scratch resistance), good dispersion quality, and improved electrical performance (including environmental cycling stability). In embodiments, the grafted inorganic materials can be present in layer(s) for imaging members, such as the charge transport layer, undercoat layer, or other layer. Other uses for the grafted inorganic materials include use in optoelectric devices such as solar cells, sensors, and the like.

Electrophotographic imaging members, including photoreceptors or photoconductors, typically include a photoconductive layer formed on an electrically conductive substrate or formed on layers between the substrate and photoconductive layer. The photoconductive layer is an insulator in the dark, so that electric charges are retained on its surface. Upon exposure to light, the charge is dissipated, and an image can be formed thereon, developed using a developer material, transferred to a copy substrate, and fused thereto to form a copy or print.

Many advanced imaging systems are based on the use of small diameter photoreceptor drums. The use of small diameter drums places a premium on photoreceptor life. A major factor limiting photoreceptor life in copiers and printers is wear. The use of small diameter drum photoreceptors exacerbates the wear problem because, for example, 3 to 10 revolutions are required to image a single letter size page. Multiple revolutions of a small diameter drum photoreceptor to reproduce a single letter size page can require up to 1 million cycles from the photoreceptor drum to obtain 100,000 prints, a desirable goal for commercial systems.

For low volume copiers and printers, bias charging rolls (BCR) are desirable because little or no ozone is produced during image cycling. However, the microcorona generated by the BCR during charging, damages the photoreceptor, resulting in rapid wear of the imaging surface, for example, the exposed surface of the charge transport layer. More specifically, wear rates can be as high as about 16 microns per 100,000 imaging cycles. Similar problems are encountered with bias transfer roll (BTR) systems.

One approach to achieving longer photoreceptor drum life is to form a protective overcoat on the imaging surface, for example, the charge transport layer of a photoreceptor. This overcoat layer must satisfy many requirements, including transport holes, resisting image deletion, resisting wear, and avoidance of perturbation of underlying layers during coating. One method of overcoating involves sol-gel silicone hardcoats.

Another approach to achieving longer life has been to reinforce the transport layer of the photosensitive member by adding fillers. Fillers that are known to have been used to increase wear resistance include low surface energy additives and cross-linked polymeric materials and metal oxides produced both through sol-gel and gas phase hydrolytic chemistries.

Problems often arise with these materials since they are often difficult to obtain in, or reduce to, the nano-size regime (less than 100 nanometers). Fillers with larger particle sizes very often are effective scatterers of light, which can adversely affect device performance. Also, dispersion in the selected binder then often becomes a problem. Even with suitably sized material, particle porosity can be a major problem as pores can act as traps for gases and ions produced by the charging apparatus. When this occurs the electrical characteristics of the photoreceptor are adversely affected. Of particular concern is the problem of deletion, a phenomenon that causes fogging or blurring of the developed image.

Japan Patent No. P3286711 discloses a photoreceptor having a surface protective layer containing at least 43 percent by weight but no more than 60 percent by weight of the total weight of the surface protective layer, of a conductive metal oxide micropowder. The micropowder has a mean grain size of 0.5 micrometers or less, and a preferred size of 0.2 micrometers or less. Metal oxide micropowders disclosed are tin oxide, zinc oxide, titanium oxide, indium oxide, antimony-doped tin oxide, tin-doped indium oxide, and the like.

U.S. Pat. No. 6,492,081 B2 discloses an electrophotographic photosensitive member having a protective layer having metal oxide particles with a volume-average particle size of less than 0.3 micrometers, or less than 0.1 micrometers.

U.S. Pat. No. 6,503,674 B2 discloses a member for printer, fax or copier or toner cartridge having a top layer with spherical particles having a particle size of lower than 100 micrometers.

U.S. patent application Ser. No. 10/379,110, U.S. Publication No. 20030077531 discloses an electrophotographic photoreceptor, image forming method, image forming apparatus, and image forming apparatus processing unit using same. Further, the reference discloses an electroconductive substrate, the outermost surface layer of the electroconductive substrate containing at least an inorganic filler, a binder resin, and an aliphatic polyester, or, alternatively, the outermost surface layer of the electroconductive substrate containing at least an inorganic filler and a binder resin and the binder resin is a copolymer polyarylate having an alkylene-arylcarboxylate structural unit.

U.S. patent application Ser. No. 09/985,347, U.S. Publication No. 20030073015 A1 discloses an electrophotographic photoreceptor, and image forming method and apparatus using the photoreceptor including an electroconductive substrate, a photosensitive layer located overlying the electroconductive substrate, and optionally a protective layer overlying the photosensitive layer, wherein an outermost layer of the photoreceptor includes a filler, a binder resin and an organic compound having an acid value of from 10 to 700 mgKOH/g. The photosensitive layer can be the outermost layer. A coating liquid for an outermost layer of a photoreceptor including a filler, a binder resin, an organic compound having an acid value of from 10 to 700 mgKOH/g and plural organic solvents.

U.S. Pat. No. 6,074,791 discloses a photoconductive imaging member having a supporting substrate, a hole blocking layer thereover, a photogenerating layer and a charge transport layer, and wherein the hole blocking layer contains a metal oxide prepared by a sol-gel process.

U.S. Pat. No. 5,645,965 discloses photoconductive members with perylenes and a number of charge transport molecules, such as amines.

Therefore, there exists a need in the art for an improved photoreceptor surface with decreased susceptibility to marring, scratching, micro-cracking, and abrasion. In addition, there exists a need in the art for a photoreceptor with a transparent, smoother, and less friction-prone surface. Further, there exists a need for a photoreceptor that has reduced or eliminated deletion. Also, there exists a need for a photoreceptor having improved electrical performance, including environmental cycling stability. Moreover, there is a need in the art for an improved filler, which has good dispersion quality in the selected binder, and has reduced particle porosity.

SUMMARY

Embodiments include a surface-grafted material comprising an inorganic material, a linking group, and a charge transport moiety capable of transporting holes or electrons, wherein the charge transport moiety is grafted to a surface of the inorganic material via the linking group.

Embodiments further include a surface-grafted material comprising a metal oxide, a linking group, and a charge transport moiety capable of transporting holes or electrons, wherein the charge transport moiety is grafted to a surface of the metal oxide via the linking group.

In addition, embodiments include a surface-grafted material comprising a nano-sized metal oxide having an average particle size of from about 1 to about 250 nanometers, a linking group, and a charge transport moiety capable of transporting holes or electrons, wherein the charge transport moiety is grafted to a surface of the nano-sized metal oxide via the linking group.

BRIEF DESCRIPTION OF THE DRAWINGS

For a better understanding of the present invention, reference may be had to the accompanying figures.

DETAILED DESCRIPTION

Figure 1:
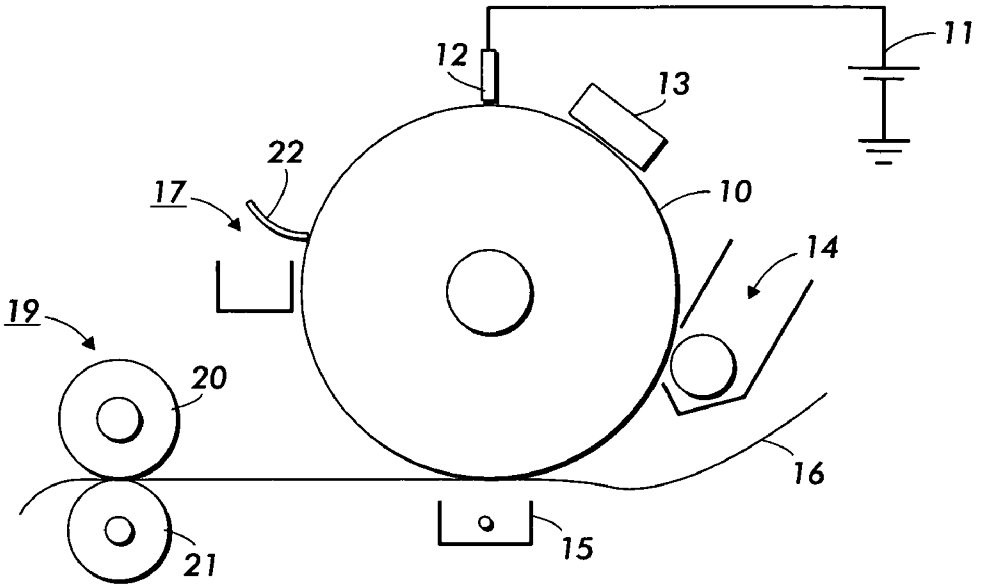
FIG. 1 is an illustration of a general electrostatographic apparatus using a photoreceptor member.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of an electrical charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. In embodiments, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Fusing may be accomplished by other fusing members such as a fusing belt in pressure contact with a pressure roller, fusing roller in contact with a pressure belt, or other like systems. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
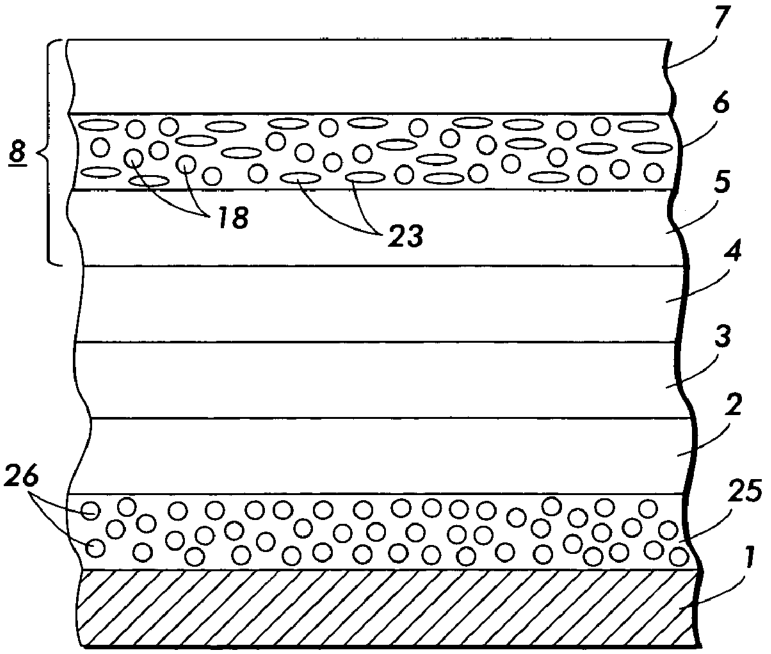
FIG. 2 is an illustration of an embodiment of a photoreceptor showing various layers and embodiments of filler dispersion.

Electrophotographic imaging members are well known in the art. Electrophotographic imaging members may be prepared by any suitable technique. Referring to FIG. 2, typically, a flexible or rigid substrate 1 is provided with an electrically conductive surface or coating 2.

The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like. The thickness of the substrate layer depends on numerous factors, including strength desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device.

In embodiments where the substrate layer is not conductive, the surface thereof may be rendered electrically conductive by an electrically conductive coating 2. The conductive coating may vary in thickness over substantially wide ranges depending upon the optical transparency, degree of flexibility desired, and economic factors. Accordingly, for a flexible photoresponsive imaging device, the thickness of the conductive coating may be between about 20 angstroms to about 750 angstroms, or from about 100 angstroms to about 200 angstroms for an optimum combination of electrical conductivity, flexibility and light transmission. The flexible conductive coating may be an electrically conductive metal layer formed, for example, on the substrate by any suitable coating technique, such as a vacuum depositing technique or electrodeposition. Typical metals include aluminum, zirconium, niobium, tantalum, vanadium and hafnium, titanium, nickel, stainless steel, chromium, tungsten, molybdenum, and the like.

An optional hole blocking layer 3 may be applied to the substrate 1 or coatings. Any suitable and conventional blocking layer capable of forming an electronic barrier to holes between the adjacent photoconductive layer 8 (or electrophotographic imaging layer 8) and the underlying conductive surface 2 of substrate 1 may be used.

An optional adhesive layer 4 may be applied to the hole-blocking layer 3. Any suitable adhesive layer well known in the art may be used. Typical adhesive layer materials include, for example, polyesters, polyurethanes, and the like. Satisfactory results may be achieved with adhesive layer thickness between about 0.05 micrometer (500 angstroms) and about 0.3 micrometer (3,000 angstroms). Conventional techniques for applying an adhesive layer coating mixture to the hole blocking layer include spraying, dip coating, roll coating, wire wound rod coating, gravure coating, Bird applicator coating, and the like. Drying of the deposited coating may be effected by any suitable conventional technique such as oven drying, infrared radiation drying, air drying and the like.

At least one electrophotographic imaging layer 8 is formed on the adhesive layer 4, blocking layer 3 or substrate 1. The electrophotographic imaging layer 8 may be a single layer (7 in FIG. 2) that performs both charge-generating and charge transport functions as is well known in the art, or it may comprise multiple layers such as a charge generator layer 5 and charge transport layer 6 and overcoat 7.

The charge generating layer 5 can be applied to the electrically conductive surface, or on other surfaces in between the substrate 1 and charge generating layer 5. A charge blocking layer or hole-blocking layer 3 may optionally be applied to the electrically conductive surface prior to the application of a charge generating layer 5. If desired, an adhesive layer 4 may be used between the charge blocking or hole-blocking layer 3 and the charge generating layer 5. Usually, the charge generation layer 5 is applied onto the blocking layer 3 and a charge transport layer 6, is formed on the charge generation layer 5. This structure may have the charge generation layer 5 on top of or below the charge transport layer 6.

Charge generator layers may comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge-generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is required for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film forming binder material may be employed as the matrix in the charge-generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder, or from about 20 percent by volume to about 30 percent by volume of the photogenerating pigment is dispersed in about 70 percent by volume to about 80 percent by volume of the resinous binder composition. In one embodiment, about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be used to mix and thereafter apply the photogenerating layer coating mixture. Typical application techniques include spraying, dip coating, roll coating, wire wound rod coating, vacuum sublimation and the like. For some applications, the generator layer may be fabricated in a dot or line pattern. Removing of the solvent of a solvent coated layer may be effected by any suitable conventional technique such as oven drying, infrared radiation drying, air drying and the like.

The charge transport layer 6 may comprise a charge transporting small molecule 23 dissolved or molecularly dispersed in a film forming electrically inert polymer such as a polycarbonate. The term "dissolved" as employed herein is defined herein as forming a solution in which the small molecule is dissolved in the polymer to form a homogeneous phase. The expression "molecularly dispersed" is used herein is defined as a charge transporting small molecule dispersed in the polymer, the small molecules being dispersed in the polymer on a molecular scale. Any suitable charge transporting or electrically active small molecule may be employed in the charge transport layer of this invention. The expression charge transporting "small molecule" is defined herein as a monomer that allows the free charge photogenerated in the transport layer to be transported across the transport layer. Typical charge transporting small molecules include, for example, pyrazolines such as 1-phenyl-3-(4'-diethylamino styryl)-5-(4"-diethylamino phenyl)pyrazoline, diamines such as N,N'-diphenyl-N,N'-bis(3-methylphenyl)-(1,1'-biphenyl)-4,4'-diamine, hydrazones such as N-phenyl-N-methyl-3-(9-ethyl)carbazyl hydrazone and 4-diethyl amino benzaldehyde-1,2-diphenyl hydrazone, and oxadiazoles such as 2,5-bis (4-N,N'-diethylaminophenyl)-1,2,4-oxadiazole, stilbenes and the like. However, to avoid cycle-up in machines with high throughput, the charge transport layer should be substantially free (less than about two percent) of di or triamino-triphenyl methane. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis(3-methylphenyl)-(1,1'-biphenyl)-4,4'-diamine. If desired, the charge transport material in the charge transport layer may comprise a polymeric charge transport material or a combination of a small molecule charge transport material and a polymeric charge transport material.

Any suitable electrically inactive resin binder insoluble in the alcohol solvent used to apply the overcoat layer 7 may be employed in the charge transport layer of this invention. Typical inactive resin binders include polycarbonate resin, polyester, polyarylate, polyacrylate, polyether, polysulfone, and the like. Molecular weights can vary, for example, from about 20,000 to about 150,000. Examples of binders include polycarbonates such as poly(4,4'-isopropylidene-diphenylene) carbonate (also referred to as bisphenol-A-polycarbonate, poly(4,4'-cyclohexylidinediphenylene) carbonate (referred to as bisphenol-Z polycarbonate), poly(4,4'-isopropylidene-3,3'-dimethyl-diphenyl)carbonate (also referred to as bisphenol-C-polycarbonate) and the like. Any suitable charge transporting polymer may also be used in the charge transporting layer. The charge transporting polymer should be insoluble in the alcohol solvent employed to apply the overcoat layer. These electrically active charge transporting polymeric materials should be capable of supporting the injection of photogenerated holes from the charge generation material and be capable of allowing the transport of these holes therethrough.

Any suitable and conventional technique may be used to mix and thereafter apply the charge transport layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like.

Generally, the thickness of the charge transport layer is between about 10 and about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers can be maintained from about 2:1 to 200:1 and in some instances as great as 400:1. The charge transport layer, is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

The thickness of the continuous overcoat layer selected depends upon the abrasiveness of the charging (e.g., bias charging roll), cleaning (e.g., blade or web), development (e.g., brush), transfer (e.g., bias transfer roll), etc., in the system employed and can range up to about 10 micrometers. In embodiments, the thickness is from about 1 micrometer and about 5 micrometers. Any suitable and conventional technique may be used to mix and thereafter apply the overcoat layer coating mixture to the charge-generating layer. Typical application techniques include spraying, dip coating, roll coating, wire wound rod coating, and the like. Drying of the deposited coating may be effected by any suitable conventional technique such as oven drying, infrared radiation drying, air drying, and the like. The dried overcoating of this invention should transport holes during imaging and should not have too high a free carrier concentration. Free carrier concentration in the overcoat increases the dark decay. In embodiments, the dark decay of the overcoated layer should be about the same as that of the unovercoated device.

An anti-curl backing layer may be present on the substrate, on the side opposite the charge transport layer. This layer is positioned on the substrate to prevent curling of the substrate.

An inorganic material surface grafted or surface anchored with a charge transport moiety can be added to at least one layer in the photoreceptor. Such layers include the blocking layer 3 of FIG. 2, the charge transport layer 6 of FIG. 2, the overcoat layer 7 of FIG. 2, and other layers. In embodiments, the surface grafted inorganic material can be added to the charge transport layer 6 as filler 18, or the blocking/undercoat layer 3 as filler 26.

An inorganic filler is surface grafted with a charge transport moiety or component. Herein, "charge transport moiety" or "charge transport component" refers to part of a hole-transport molecule or part of an electron transport molecule. A charge transport molecule is an electron transport molecule or a hole-transporting molecule. A hole-transport molecule functions to conduct holes, and an electron transport molecule functions to conduct electrons.

In embodiments, the inorganic material is relatively simple to disperse, has relatively high surface area to unit volume ratio, has a larger interaction zone with dispersing medium, is non-porous, and/or chemically pure. Further, in embodiments, the inorganic material is highly crystalline, spherical, and/or has a high surface area.

Examples of inorganic materials include silica, metals, metal alloys, and metal oxide fillers such as metal oxides of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, unnilquadium, unnilpentium, and unnilhexium (unh inner transition elements of lanthanides of lanthanum, cerium, praseodymium, neodymium, promethium, samarium, europium, gadolinium, terbium, dysprosium, holmium, erbium, thulium, ytterbium, and lutetium; actinides of actinium, thorium, protactinium, uranium, neptunium, plutonium, americium, curium, berkelium, californium, einsteinium, fermium, mendelevium, nobelium, and lawrencium; perovskites of SrTiO3, CaTiOc; oxides of metals of the second main group of beryllium, magnesium, calcium, strontium, barium, radium; oxides of metals of the third main group of boron, aluminum, gallium, indium, and thallium; oxides of metals of a fourth main group of silicon, germanium, tin and lead; a member wherein the oxide is titanium dioxide; a member wherein the oxide is anatase titanium dioxide, and the like.

Specific examples include metal oxides such as titanium dioxide, silicon oxide, aluminum oxide, chromium oxide, zirconium oxide, zinc oxide, tin oxide, iron oxide, magnesium oxide, manganese oxide, nickel oxide, copper oxide, conductive antimony pentoxide, and indium tin oxide, and the like, and mixtures thereof.

The inorganic material can be prepared via plasma synthesis or vapor phase synthesis, in embodiments. This synthesis distinguishes these particulate fillers from those prepared by other methods (particularly hydrolytic methods), in that the fillers prepared by vapor phase synthesis are non-porous as evidenced by their relatively low BET values. An example of an advantage of such prepared fillers is that the crystalline-shaped inorganic materials are less likely to absorb and trap gaseous corona effluents.

In embodiments, the grafted inorganic material is added to the layer or layers of the photosensitive member in an amount of from about 0.1 to about 80 percent, from about 3 to about 60 percent, or from about 5 to about 40 percent by weight of total solids. Amount by weight of total solids refers to the total solids amount in the layer, including amounts of resins, polymers, fillers, and the like solid materials.

In embodiments, the inorganic material can be small, such as, for example, a nano-size inorganic material.

Examples of nano-size fillers include fillers having an average particle size of from about 1 to about 250 nanometers, or from about 14 to about 199 nanometers, or from about 1 to about 195 nanometers, or from about 1 to about 175 nanometers, or from about 1 to about 150 nanometers, or from about 1 to about 100 nanometers, or from about 1 to about 50 nanometers.

In embodiments, the inorganic material filler has a surface area/BET of from about 10 to about 200, or from about 20 to about 100, or from about 20 to about 50, or about 42 $m^2/g$.

In embodiments, the inorganic material filler is grafted or anchored with a charge transport moiety. The charge transport moiety comprises an anchoring group, which facilitates anchoring or grafting of the charge transport moiety to the inorganic material. Suitable anchoring groups include those selected from the group consisting of silanes, carboxylic acids, hydroxyl group, phosphoric acids, and ene-diols.

The charge transport moiety further comprises a linkage attaching the charge transport moiety to the anchoring group. The linkage and charge transport moiety are then grafted onto the inorganic material. The anchoring group facilitates anchoring of the charge transport moiety (with linking group) to the inorganic material.

Figure 3:
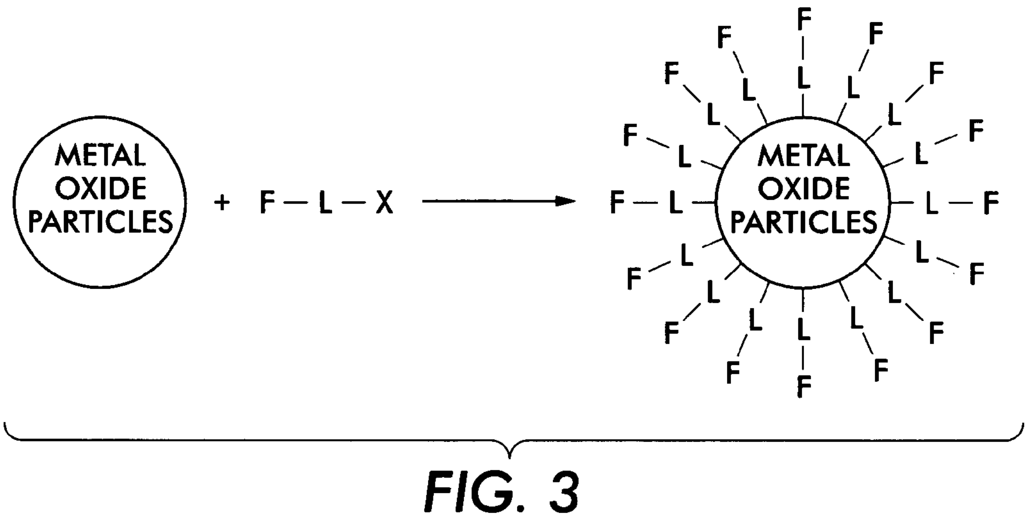
FIG. 3 is a graphic illustration of the process for forming a grafted metal oxide particle.

Generally, the process for surface grafting the charge transport moiety or component onto the inorganic material includes the scheme as show in FIG. 3. In FIG. 3, F represents the charge transport moiety or component on the charge transport molecule; L represents a divalent linkage, such as, for example, alkylene, arylene, and others; and X represents an anchoring or grafting group, such as a silane, silanol, silicate, hydroxyl, enediolate, phosphonic acid, phosphonate, carboxylic acid, or an ene-diol group.

In embodiments, the surface grafted inorganic material is prepared by reacting the anchoring or grafting group with the reactive surface of the inorganic material, such as a metal oxide. This forms a charge-transporting shell on the core of the inorganic material. The surface treatment can be carried out by mixing the inorganic material with the molecule containing charge transport component or moiety and anchoring or grafting group in an organic solvent to form a dispersion of the inorganic particle with the charge transport moieties or molecules containing the anchoring groups. The mixing can be carried out at a temperature ranging from about 25° C. to about 250° C., or from about 25° C. to about 200° C. for a time, such as for several hours. After the surface treatment, the excess surface treating agents can be removed by washing with an organic solvent. The attachment of the organic charge transport molecules to the inorganic material can be confirmed by FTIR and TGA analysis.

Examples of linkages include linkages comprising from about 1 to about 15 carbons, or from about 1 to about 9 carbons, such as methylene, dimethylene, trimethylene, tetramethylene, and the like; and other linkages including esters; ethers; thio-ethers; amides; ketones; and urethanes.

Charge transport moiety is defined as a moiety or component having a function of transporting holes or electrons. The charge transport moiety may be a hole transport moiety or an electron transport moiety.

In embodiments, the charge transport moiety is selected from hole transporting moieties such as triarylamines, pyrazolines such as 1-phenyl-3-(4'-diethylamino styryl)-5-(4"-diethylamino phenyl)pyrazoline, diamines such as N,N'-diphenyl-N,N'-bis(3-methylphenyl)-(1,1'-biphenyl)-4,4'-diamine, hydrazones such as N-phenyl-N-methyl-3-(9-ethyl)carbazyl hydrazone and 4-diethyl amino benzaldehyde-1,2-diphenyl hydrazone, and oxadiazoles such as 2,5-bis (4-N,N'-diethylaminophenyl)-1,2,4-oxadiazole, stilbenes, phthalocyanines, metal phthalocyanines, and the like. Other examples include amines such as aromatic amines, di-, tri- and tertiary amines, and other amines, specific examples of which include N,N'-diphenyl-N,N'-bis(3-methylphenyl)-(1,1'-biphenyl)-4,4'-diamine, N,N'-diphenyl-N,N'-bis(alkylphenyl)-1,1-biphenyl-4,4'-diamine wherein alkyl is selected from the group consisting of methyl, ethyl, propyl, butyl, hexyl, and the like; N-N-diphenyl-(1,1'-biphenyl)-4-amine, N,N-diphenyl-(alkylphenyl)-amine and N,N'-diphenyl-N,N'-bis(halophenyl)-1,1'-biphenyl-4,4'-diamine wherein the halo substituent is preferably a chloro substituent, triarylamines, and the like.

More specifically, the hole transport moiety or component is selected from the group consisting of

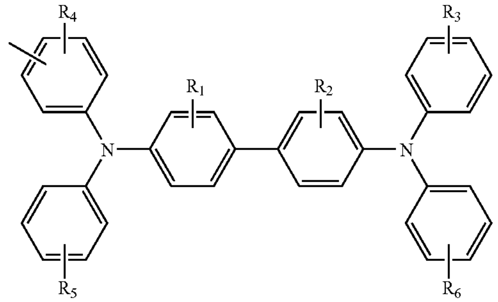

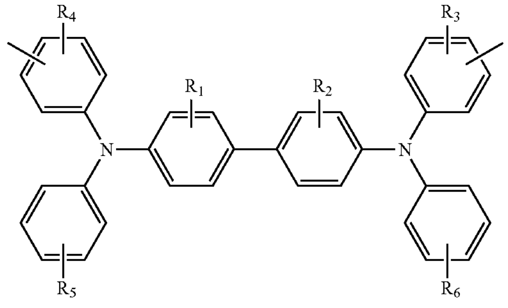

-continued
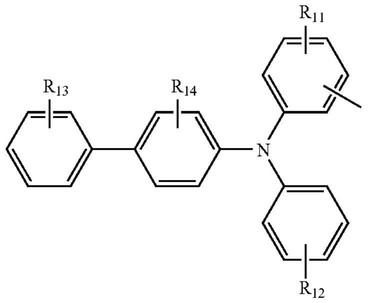
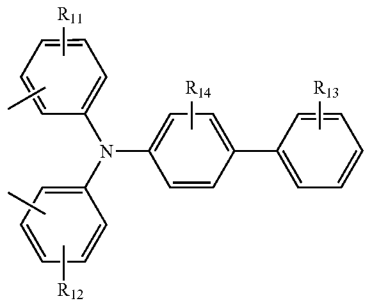
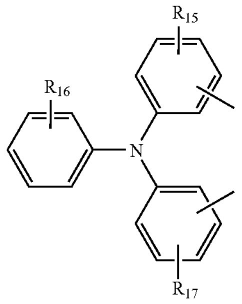
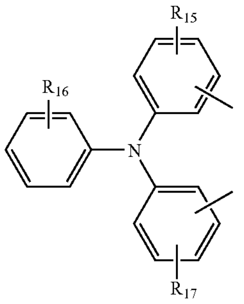
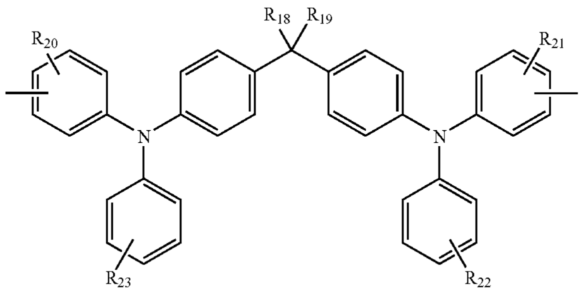
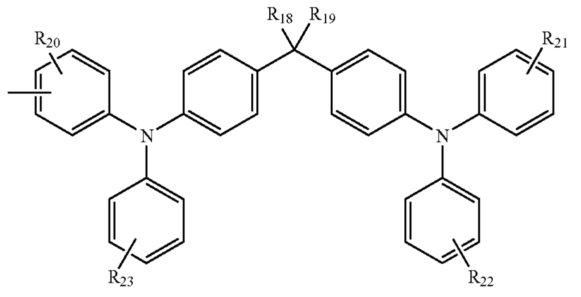
-continued
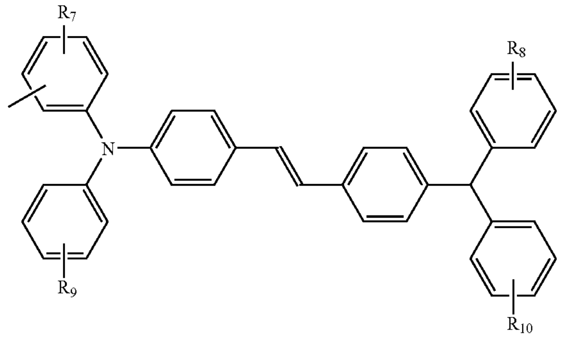
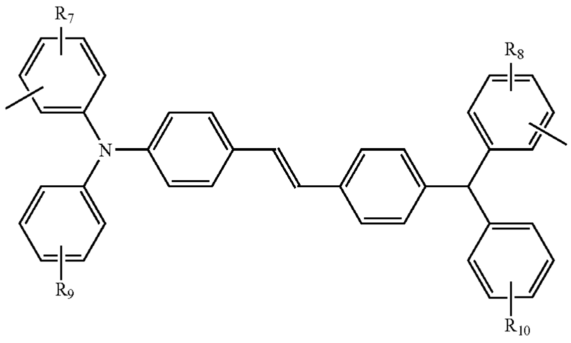
wherein $R_1$ to $R_{23}$ independently selected from a hydrogen atom, an alkyl with from about 1 to about 10 carbon atoms, a cyclic alkyl with from about 1 to about 10, an alkoxyl group with about 1 to about 5 carbon atoms, and halogen atoms.
The hole transport moiety having an anchoring group is further selected from a group consisting of
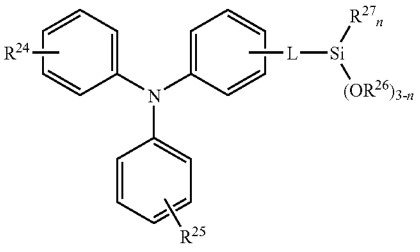
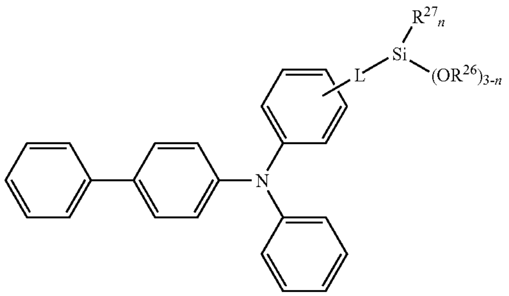

-continued

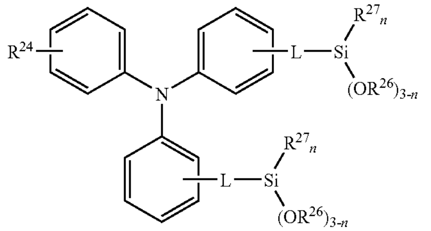

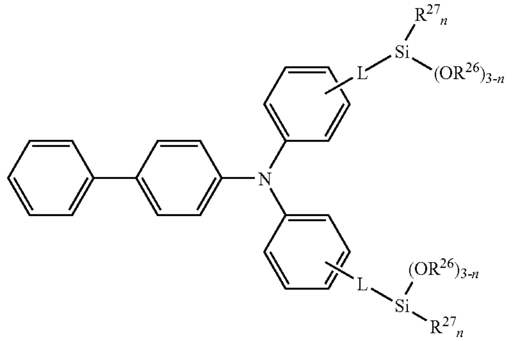

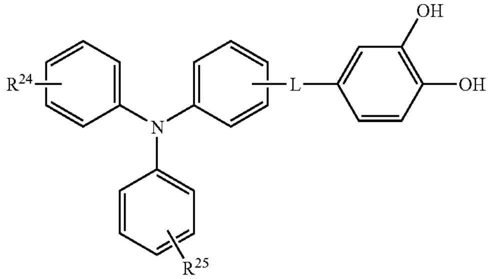

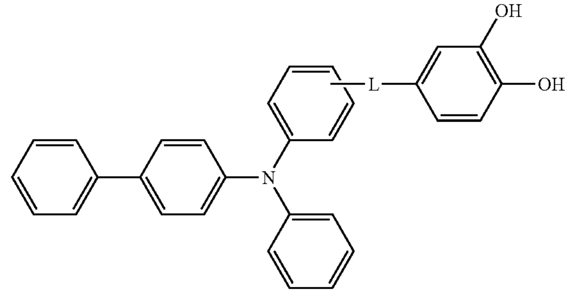

wherein $R^{24}$ and $R^{25}$ are independently selected from a hydrogen atom, an alkyl with from about 1 to about 10 carbon atoms, a cyclic alkyl with from about 1 to about 10 carbon atoms, an alkoxyl group with from about 1 to about 5 carbon atoms, and halogen atoms; $R^{26}$ and $R^{27}$ are independently selected from an alkyl with from about 1 to about 10 carbon atoms, and an aryl with from about 6 to about 30 carbon atoms; n is a number of 0, 1, or 2; L is a divalent group of an alkylene or a substituted alkylene with from about 1 to about 10 carbon atoms, or an arylene or substituted arylene with from about 6 to about 30 carbon atoms, wherein said divalent group further contains oxygen, nitrogen, and sulfur atoms.

Other examples of charge transporting moieties include electron transporting moieties such as aromatic imides such as naphthalimides and diimides such as naphthalenetetracarboxylic diimide, perylenetetracarboxylic diimide, and the like, and more specifically N-pentyl,N'-propylcarboxyl-1,4,5,8-naphthalenetetracarboxylic diimide, N-(1-methyl)hexyl, N'-propylcarboxyl-1,7,8,13-perylenetetracarboxylic diimide, and the like; fluorenylidene malonitriles such as carboxyfluorenylidene malononitrile; quinones such as anthraquinones, carboxybenzy naphthaquinone, and the like.

More specifically, the electron transport component with an anchoring group is selected from the group consisting of

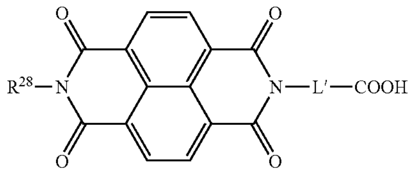

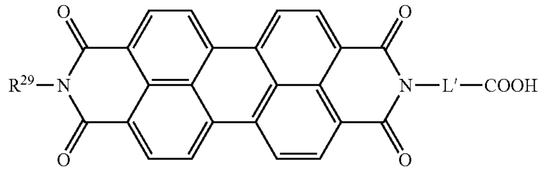

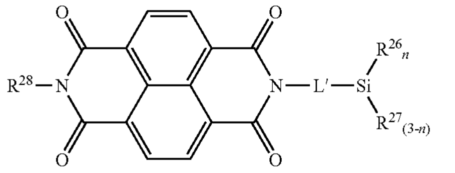

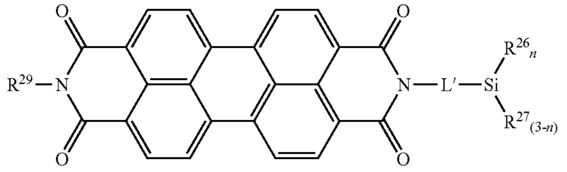

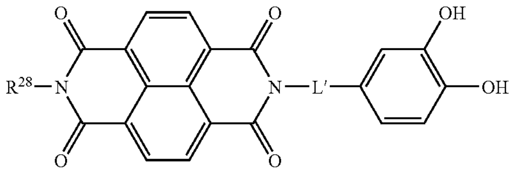

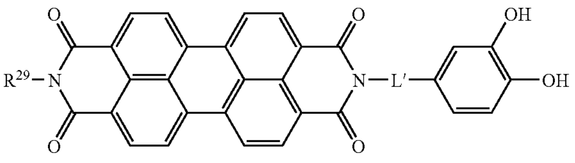

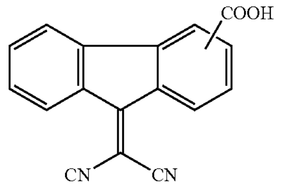

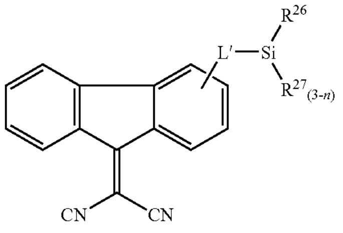

-continued

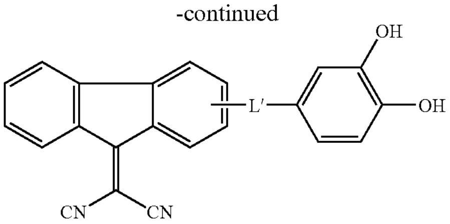

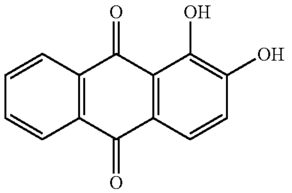

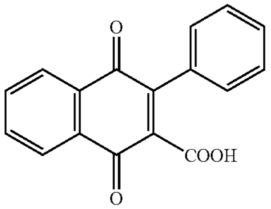

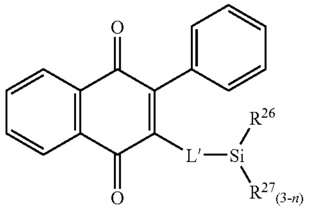

wherein $R^{26}$ and $R^{27}$ are independently selected from an alkyl with from about 1 to about 10 carbon atoms, and an aryl with from about 6 to about 30 carbon atoms; $R^{28}$ and $R^{29}$ are independently selected from an alkyl with from about 1 to about 10 carbon atoms, and an aryl with from about 6 to about 30 carbon atoms; n is a number of 0, 1, or 2; L' is a divalent group of an alkylene or a substituted alkylene with from about 1 to about 10 carbon atoms, or an arylene or substituted arylene with from about 6 to about 30 carbon atoms, wherein said divalent group further contains oxygen, nitrogen, and/or sulfur atoms.

In embodiments, the grafted inorganic material can be prepared by sol-gel process. The sol-gel process comprises, for example, the preparation of the sol, gelation of the sol, and removal of the solvent. The preparation of a metal oxide sol is disclosed in, for example, B. O'Regan, J. Moser, M. Anderson and M. Gratzel, J. Phys. Chem., vol. 94, pp. 8720-8726 (1990), C. J. Barbe, F. Arendse, P. Comte, M. Jirousek, F. Lenzmann, V. Shklover and M. Gratzel, J. Am. Ceram. Soc., vol. 80(12), pp. 3157-3171 (1997), Sol-Gel Science, eds. C. J. Brinker and G. W. Scherer (Academic Press Inc., Toronto, 1990), 21-95, U.S. Pat. No. 5,350,644, M. Graetzel, M. K. Nazeeruddin and B. O'Regan, Sep. 27, 1994, P. Arnal, R. J. P. Corriu, D. Leclercq, P. H. Mutin and A. Vioux, Chem. Mater., vol. 9, pp. 694-698 (1997), the disclosures of which are incorporated herein by reference in their entirety. Chemical additives can be reacted with a precursor metal oxide to modify the hydrolysis-condensation reactions during sol preparation and which precursors have been disclosed in J. Livage, Mat. Res. Soc. Symp. Proc., vol. 73, pp. 717-724 (1990), the disclosure of which is totally incorporated herein by reference. Sol refers for example, to a colloidal suspension, solid particles, in a liquid, reference P. J. Flory, Faraday Disc., Chem. Society, 57, pages 7-18 for example, 1974, and gel refers, for example, to a continuous solid skeleton enclosing a continuous liquid phase, both phases being of colloidal dimensions, or sizes. A gel can be formed also by covalent bonds or by chain entanglement.

A sol can be considered a colloidal suspension of solid particles in a liquid, and wherein the gel comprises continuous solid and fluid phases of colloidal dimensions, with a colloid being comprised of a suspension where the dispersed phase is approximately 1 to 1,000 nanometers in diameter, from about 1 to about 250 nanometers, from about 1 to about 199 nanometers, from about 1 to about 195 nanometers, from about 1 to about 175 nanometers, from about 1 to about 150 nanometers, from about 1 to about 100 nanometers, or from about 1 to about 50 nanometers.

As the gel is dried and solvent removed, a film is obtained. The sol-gel process has been described in Sol-Gel Sciences, eds. C. J. Brinker and G. W. Scherer (Academic Press Inc., Toronto, 1990), the disclosure of which is totally incorporated herein by reference in its entirety.

A first step in the preparation of the sol-gel blocking layer is to prepare the sol and graft the charge transporting moiety onto the sol. The inorganic material, such as a metal oxide such as, for example, alumina, titania, zinc oxide, or the like, and an organic solvent, can be mixed along with the charge transporting moiety. Heating and stirring for up to several hours, such as from about 1 to about 20, or from about 3 to about 10 hours, may follow to effect mixing. After the surface treatment, the excess surface treatment agents can be removed by washing with an organic solvent.

All the patents and applications referred to herein are hereby specifically, and totally incorporated herein by reference in their entirety in the instant specification.

The following Examples further define and describe embodiments of the present invention. Unless otherwise indicated, all parts and percentages are by weight.

EXAMPLES

Example 1

Preparation of Aluminum Oxide Nano-Particles Anchored with Triarylamine Hole Transport Molecule Containing Silane Anchoring Group The following formula is a silane anchoring group that can be used. It is referred to herein as "Compound I."

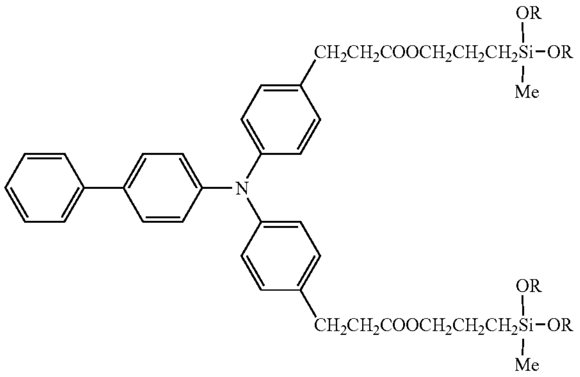

Aluminum oxide nano-particles having an average particle size of about 39 nanometers (10 g) and Compound I (0.1 grams) were sonicated in dodecane (100 grams) for 20 minutes. This was followed by heating and stirring the dispersion for 12 hours. After the surface treatment, the excess surface treatment agents were removed by washing with an organic solvent. The isolated particles were dried at 120° C. for about 12 hours. The attachment of the organic charge transport molecules was confirmed by FTIR and TGA analysis.

Example 2

Preparation and Testing of Photoreceptor Having Aluminum Oxide Nano-Particles Anchored with Hole Transport Molecule Containing Silane Anchoring Group Dispersed in Charge Transport Layer On a 75 micron thick titanized MYLAR® substrate was coated by draw bar technique, a barrier layer formed from hydrolyzed gamma aminopropyltriethoxysilane having a thickness of 0.005 micron. The barrier layer coating composition was prepared by mixing 3-aminopropyltriethoxysilane with ethanol in a 1:50 volume ratio. The coating was allowed to dry for 5 minutes at room temperature, followed by curing for 10 minutes at 110° C. in a forced air oven. On top of the blocking layer was coated a 0.05 micron thick adhesive layer prepared from a solution of 2 weight percent of a DuPont 49K (49,000) polyester in dichloromethane. A 0.2 micron photogenerating layer was then coated on top of the adhesive layer with a wire wound rod from a dispersion of hydroxy gallium phthalocyanine Type V (22 parts) and a vinyl chloride/vinyl acetate copolymer, VMCH ($M_n$=27,000, about 86 weight percent of vinyl chloride, about 13 weight percent of vinyl acetate and about 1 weight percent of maleic acid) available from Dow Chemical (18 parts), in 960 parts of n-butylacetate, followed by drying at 100° C. for 10 minutes. Subsequently, a 24 μm thick charge transport layer (CTL) was coated on top of the photogenerating layer by a draw bar from a dispersion of the surface grafted alumina particles of Example 1 (9 parts), N,N'-diphenyl-N,N-bis(3-methylphenyl)-1,1'-biphenyl-4,4'-diamine (67.8 parts), 1.7 parts of 2,6-Di-tert-butyl-4-methylphenol (BHT) from Aldrich and a polycarbonate, PCZ-400 [poly(4,4'-dihydroxy-diphenyl-1-1-cyclohexane), $M_w$=40,000] available from Mitsubishi Gas Chemical Company, Ltd. (102 parts) in a mixture of 410 parts of tetrahydrofuran (THF) and 410 parts of monochlorobenzene. The CTL was dried at 115° C. for 60 minutes.

The above dispersion with solid components of surface treated alumina particles of Example I was prepared by predispersed alumina in a sonicator bath (Branson Ultrasonic Corporation Model 2510R-MTH) with monochlorobenzene and then added to the rest charge transport liquid to form a stable dispersion and roll milled for an extended period of time of 6 to 36 hours before coating. The electrical and wear properties of the above resulting photoconductive member were measured in accordance with the procedure described in Example IV. The results are shown in Table 1 below.

TABLE 1

| Device | Vddp (−V) | E1/2 (Ergs/cm)2 | Dark Decay (V @ 500 ms) | Vr (V) | Wear (nm/k cycles) |
|---|---|---|---|---|---|
| Control Device Without Al2O3 | 811 | 1.36 | 22 | 4.0 | 41.5 |
| Device with Al2O3 | 811 | 1.31 | 20 | 1.6 | 15.2 |

Example 3

Preparation of Titanium Oxide Nanoparticles Surface Grafted with CFM

Titanium oxide nano-particles having an average particle size of about 70 nanometer (40 g) and CFM (0.4 g), were sonicated in tetrahydrofuran (400 g). This was followed by heating and stirring the dispersion at about 55° C. for 12 hours. After the surface treatment, the excess surface treatment agents were removed by washing with an organic solvent. The isolated particles were dried at about 100° C. for 12 hours. The attachment of the organic charge transport molecules was confirmed by FTIR and TGA analysis. The following is the structure of CFM:

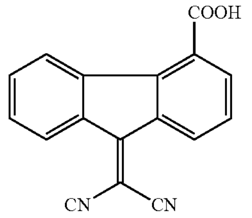

Example 4

Preparation of Titanium Oxide Nanoparticles Surface Grafted with N-pentyl,N'-propylcarboxyl-1,4,5,8-naphthalenetetracarboxylic Diimide Titanium oxide nano-particles having an average particle size of about 70 nanometer (40 g) and N-pentyl, N'-propylcarboxyl-1,4,5,8-naphthalenetetracarboxylic diimide (0.4 g) were sonicated in tetrahydrofuran (400 g). This was followed by heating and stirring the dispersion at about 55° C. for 12 hours. After the surface treatment, the excess surface treatment agents were removed by washing with an organic solvent. The isolated particles were dried at about 100° C. for 12 hours. The attachment of the organic charge transport molecules was confirmed by FTIR and TGA analysis.

Example 5

Preparation of Titanium Oxide Nanoparticles Surface Grafted with N-(1-methyl)hexyl,N'-propylcarboxyl-1,7,8,13-perylenetetracarboxylic Diimide Titanium oxide nano-particles having an average particle size of about 70 nanometer (40 g) and N-(1-methyl)hexyl,N'-propylcarboxyl-1,7,8,13-perylenetetracarboxylic diimide (0.4 g) were sonicated in chlorobenzene (400 g). This was followed by heating and stirring the dispersion at about 130°

C. for 12 hours. After the surface treatment, the excess surface treatment agents were removed by washing with THF. The isolated particles were dried at about 100° C. for 12 hours. The attachment of the organic charge transport molecules was confirmed by FTIR and TGA analysis.

Example 6

Preparation of Titanium Oxide Nanoparticles Surface Grafted with Alizarin

Titanium oxide nano-particles having an average particle size of about 70 nanometer (40 g) and alizarin (0.4 g), were sonicated in tetrahydrofuran (400 g). This was followed by heating and stirring the dispersion at about 55° C. for 12 hours. After the surface treatment, the excess surface treatment agents were removed by washing with an organic solvent. The isolated particles were dried at about 100° C. for 12 hours. The attachment of the organic charge transport molecules was confirmed by FTIR and TGA analysis.

Example 7

Preparation and Testing Photoreceptor Having Surface Grafted Titanium Oxide Filler Dispersed in Undercoat Layer The dispersion of the undercoat (hole blocking) was prepared by mixing $TiO_2$ particles (30 grams), Varcum 29159 (40 grams, 50% solid in butanol/xylene=50/50, OxyChem), and 30 grams of 50/50 butanol/xylene. An amount of 300 grams of cleaned $ZrO_2$ beads (0.4-0.6 mm) were added and the dispersion was roll milled for 7 days at 55 rpm. The particle size of the dispersion was determined by a Horiba particle analyzer. The results were 0.07±0.06 μm, and a surface area of 24.9 $m^2/g$ for alizarin-grafted $TiO_2$/Varcum dispersion.

A 30-millimeter aluminum drum substrate was coated using known Tsukiage coating technique with a hole blocking layer from the above dispersions. After drying at 145° C. for 45 minutes, blocking layers or undercoat layers (UCL) with varying thickness were obtained by controlling pull rates. The thickness varied as 3.9, 6, and 9.6 microns. A 0.2 micron photogenerating layer was subsequently coated on top of the hole blocking layer from a dispersion of chlorogallium phthalocyanine (0.60 gram) and a binder of polyvinyl chloride-vinyl acetate-maleic acid terpolymer (0.40 gram) in 20 grams of a 1:2 mixture of n-butyl acetate/xylene solvent. Subsequently, a 22-micron charge transport layer (CTL) was coated on top of the photogenerating layer from a solution of N,N'-diphenyl-N,N-bis(3-methyl phenyl)-1,1'-biphenyl-4,4'-diamine (8.8 grams) and a polycarbonate, PCZ-400 [poly(4,4'-dihydroxy-diphenyl-1-1-cyclohexane, Mw=40000)] available from Mitsubishi Gas Chemical Co., Ltd. (13.2 grams) in a mixture of 55 grams of tetrahydrofuran (THF), and 23.5 grams of toluene. The CTL was dried at 120° C. for 45 minutes.

The control devices with untreated $TiO_2$ UCL were prepared by the same method except that the dispersion used untreated $TiO_2$ as the filler.

The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value Vo of about −500 volts. Each member was exposed to light from a 670 nanometer laser with >100 ergs/$cm^2$ exposure energy, thereby inducing a photodischarge which resulted in a reduction of surface potential to a Vr value, residual potential. The following Table 2 summarizes the electrical performance of these devices, and illustrates the electron transport enhancement of the illustrative photoconductive members. The enhancement in electron mobility with Alizarin-grafted $TiO_2$ UCL was demonstrated by the decrease in Vr with the same UCL thickness. These parameters indicate that a greater amount of charge was moved out of the photoreceptor, resulting in a lower residual potential. The results are shown in Table 2 below.

TABLE 2

| | UCL thickness | Vr (V) |
|---|---|---|
| alizarin-$TiO_2$/Varcum UCL | 3.9 microns | 33 |
| | 6.0 microns | 57 |
| | 9.6 microns | 118 |
| $TiO_2$/Varcum UCL | 3.9 microns | 42 |
| | 6.1 microns | 79 |
| | 9.4 microns | 174 |

Examples 8-10

Preparation of Zinc Oxide Nanoparticles Surface Grafted with Electron Transport Moeities The zinc oxide nanoparticles surface grafted with electron transport components were prepared by the same method as for Examples 3-5, except zinc oxide nanoparticles having an average particle size of about 70 nanometer were used in Example 8-10.

While the invention has been described in detail with reference to specific embodiments, it will be appreciated that various modifications and variations will be apparent to the artisan. All such modifications and embodiments as may readily occur to one skilled in the art are intended to be within the scope of the appended claims.

What is claimed is:

1. A surface-grafted material comprising an inorganic filler, a linking group, and a hole transport moiety capable of transporting holes, wherein said hole transport moiety is selected from the group consisting of N,N'-diphenyl-N,N'-bis(3-methylphenyl)-(1,1'-biphenyl)-4,4'-diamine, N,N'-diphenyl-N,N'-bis(halophenyl)-1,1'-biphenyl-4,4'-diamine, N,N'-diphenyl-N,N'-bis(alkylphenyl)-1,1-biphenyl-4,4'-diamine, N,N-diphenyl-(1,1'-biphenyl)-4-amine, N,N-diphenyl-(alkylphenyl)-amine, 1-phenyl-3-(4'-diethylamino styryl)-5-(4''-diethylamino phenyl) pyrazoline, N-phenyl-N-methyl-3-(9-ethyl)carbazyl hydrazone, 4-diethyl amino benzaldehyde-1,2-diphenyl hydrazone, 2,5-bis(4-N,N'-diethylaminophenyl)-1,3,4-oxadiazole, and mixtures thereof, and said hole transport moiety is grafted to a surface of said inorganic filler via said linking group, wherein said inorganic filler is selected from the group consisting of titanium dioxide, aluminum oxide, zinc oxide, and mixtures thereof.

2. A surface-grafted material comprising an inorganic filler, a linking group, and a hole transport moiety capable of transporting holes, wherein said inorganic filler is via said linking group with a hole transport component comprising an anchoring group, said hole transport component comprising an anchoring group being selected from the group consisting of

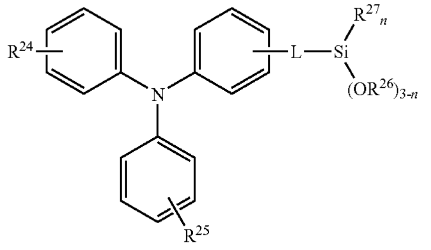

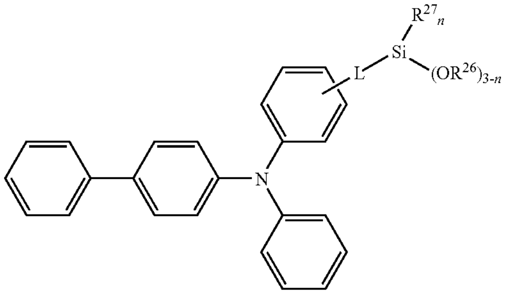

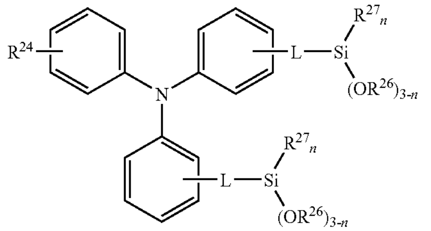

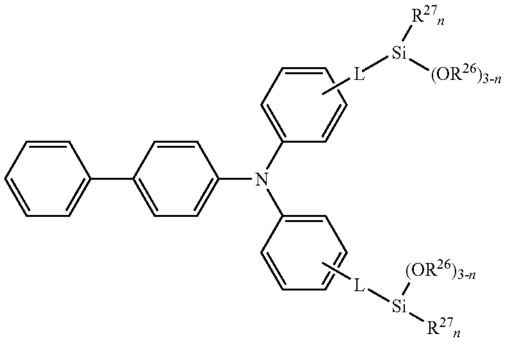

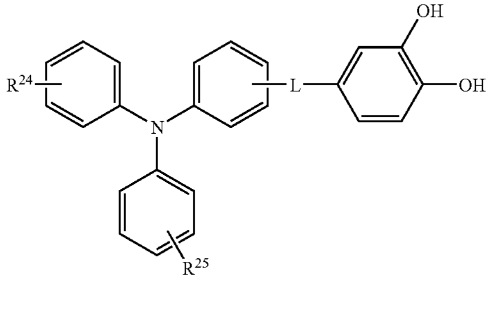

-continued

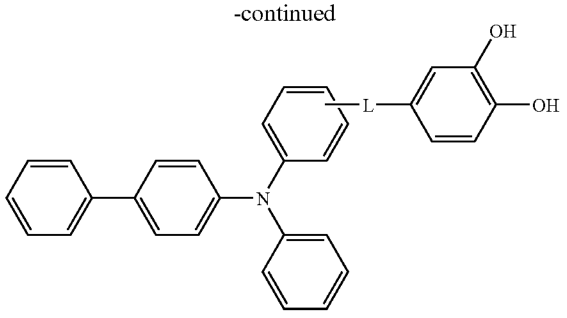

wherein $R^{24}$ and $R^{25}$ are independently selected from the group consisting of a hydrogen atom, an alkyl having from about 1 to about 10 carbon atoms, a cyclic alkyl having from about 1 to about 10 carbon atoms, an alkoxyl group having from about 1 to about 5 carbon atoms, and halogen atoms; $R^{26}$ and $R^{27}$ are independently selected from the group consisting of an alkyl having from about 1 to about 10 carbon atoms, and an aryl having from about 6 to about 30 carbon atoms; n is a number of 0, 1, or 2; Lisa divalent group selected from the group consisting of an unsubstituted alkylene having from about 1 to about 10 carbons, a substituted alkylene having from about 1 to about 10 carbon atoms, an unsubstituted arylene having from about 6 to about 30 carbons, and a substituted arylene having from about 6 to about 30 carbon atoms.

3. A surface-grafted material in accordance with claim 2, wherein said divalent group further comprises a component selected from the group consisting of oxygen, nitrogen, and sulfur atoms.

4. A surface-grafted material in accordance with claims 1 or 2, wherein said inorganic filler comprises nano-size inorganic materials having an average particle size of from about 1 to about 250 nanometers.

5. A surface-grafted material in accordance with claims 1 or 2, wherein said inorganic filler has a surface area BET value of from about 20 to about 200 $m^2/g$.

6. A surface-grafted material in accordance with claims 1 or 2, wherein said linking group comprises an anchoring group selected from the group consisting of carboxylic acid, carboxylate, hydroxyl, ene-diol, ene-diolate, silicate, silanol, phosphonic acid, and phosphonate.

7. A surface-grafted material in accordance with claim 6, wherein said linking group further comprises a divalent group having from about 1 to about 15 carbons between said anchoring group and said hole transport moiety.

8. A surface-grafted material in accordance with claims 1 or 2, wherein said linking group is selected from an alkylene having from about 1 to about 9 carbons and an alkylene containing a group selected from the group consisting of esters, ethers, thio-ethers, amides, ketones, and urethanes.

9. A surface-grafted material comprising a sol gel metal oxide filler selected from the group consisting of titanium dioxide, aluminum oxide, zinc oxide, and mixtures thereof; a linking group; and an electron transport moiety capable of transporting electrons, wherein said electron transport moiety is selected from the group consisting of N-pentyl, N-propylcarboxyl-1,4,5,8-naphthalenetetracarboxylic diimide and N-(1-methyl) hexyl, N'-propylcarboxyl-1,7,8,13-perylenetetracarboxylic diimide, and wherein said electron transport moiety is grafted to a surface of the sol gel metal oxide via said linking group.

10. A surface-grafted material comprising a sol gel metal oxide filler selected from the group consisting of titanium dioxide, aluminum oxide, zinc oxide, and mixtures thereof; a linking group; and an electron transport moiety capable of transporting electrons, wherein said electron transport moiety comprises anchoring groups and is grafted to a surface of the sol gel metal oxide via said linking group, and wherein said electron transport moiety comprising anchoring groups are selected from the group consisting of

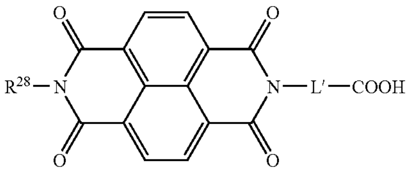

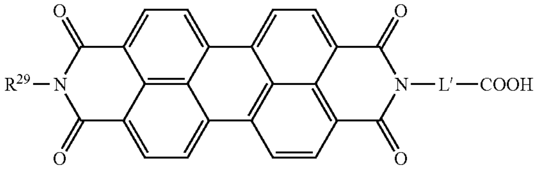

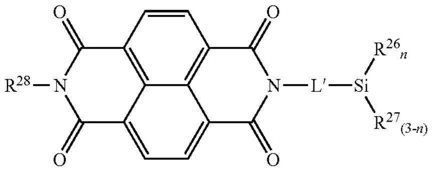

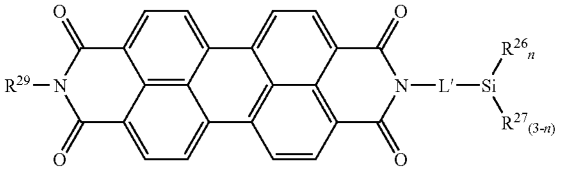

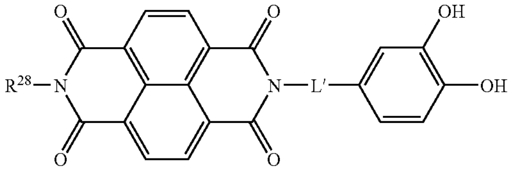

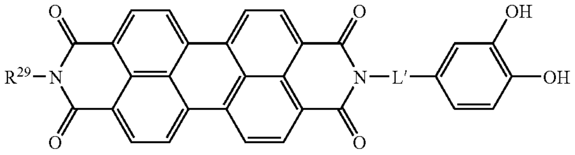

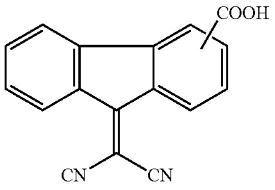

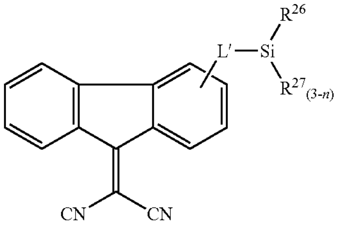

-continued

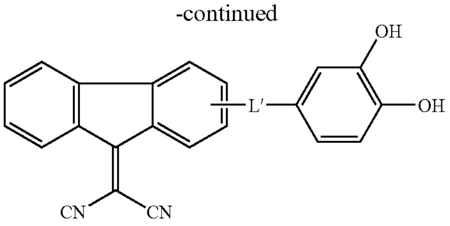

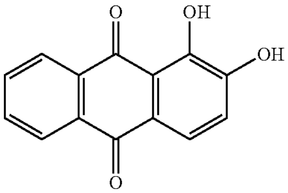

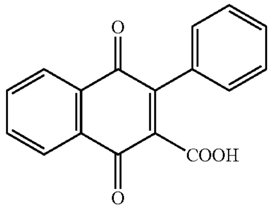

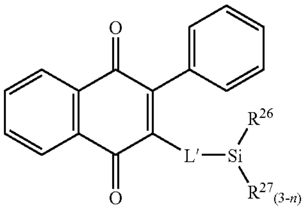

wherein $R^{26}$ and $R^{27}$ are independently selected from the group consisting of an alkyl with from about 1 to about 10 carbon atoms, and an aryl with from about 6 to about 30 carbon atoms; $R^{28}$ and $R^{29}$ are independently selected from the group consisting of an alkyl with from about 1 to about 10 carbon atoms, and an aryl with from about 6 to about 30 carbon atoms; n is a number of 0, 1, or 2; L' is a divalent group selected from the group consisting of an unsubstituted alkylene having from about 1 to about 10 carbons, a substituted alkylene with from about 1 to about 10 carbon atoms, an unsubstituted arylene having from about 6 to about 30 carbons, and a substituted arylene having from about 6 to about 30 carbon atoms.

11. A surface-grafted material comprising an inorganic filler, a linking group, and a hole transport moiety capable of transporting holes, wherein said hole transport moiety is grafted to a surface of said inorganic filler via said linking group, wherein said inorganic filler is selected from the group consisting of titanium dioxide, aluminum oxide, zinc oxide, and mixtures thereof, and wherein said hole transport moiety is selected from the group consisting of N,N'-diphenyl-N,N'-bis(3-methylphenyl)-(1,1'-biphenyl)-4,4'-diamine, N,N'-diphenyl-N,N'-bis(halophenyl)-1,1'-biphenyl-4,4'-diamine, N,N'-diphenyl-N,N'-bis(alkylphenyl)-1,1-biphenyl-4,4'-diamine, N,N-diphenyl-(1,1'-biphenyl)-4-amine, N,N-diphenyl-(alkylphenyl)-amine, 1-phenyl-3-(4'-diethylamino styryl)-5-(4"-diethylamino phenyl)pyrazoline, N-phenyl-N-methyl-3-(9-ethyl)carbazyl hydrazone, 4-diethyl amino benzaldehyde-1,2-diphenyl hydrazone, 2,5-bis(4-N,N'-diethylaminophenyl)-1,3,4-oxadiazole, and mixtures thereof.

* * * * *